March 18, 1930.  H. D. WALTRIP ET AL  1,750,738
CIRCUIT CLOSER
Filed Jan. 18, 1929
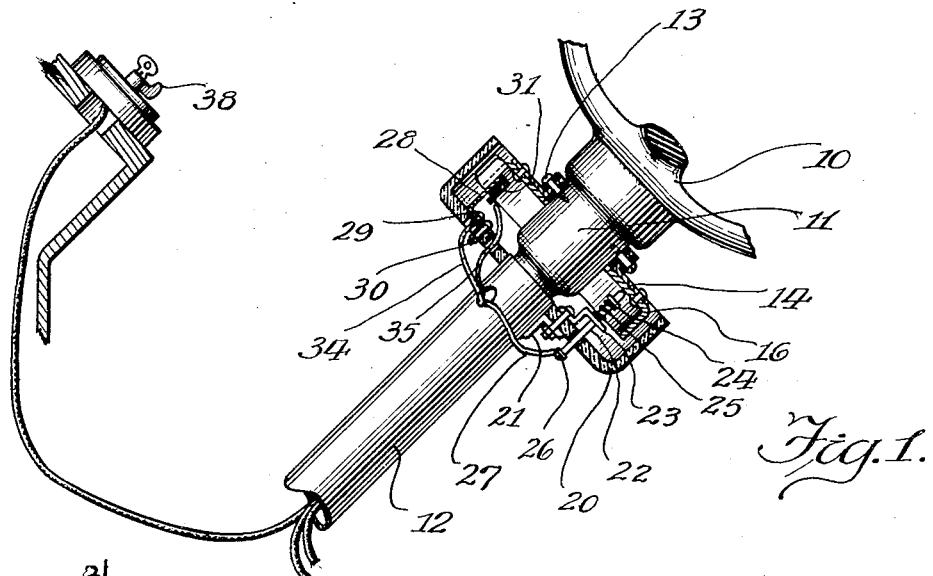
Fig.1.
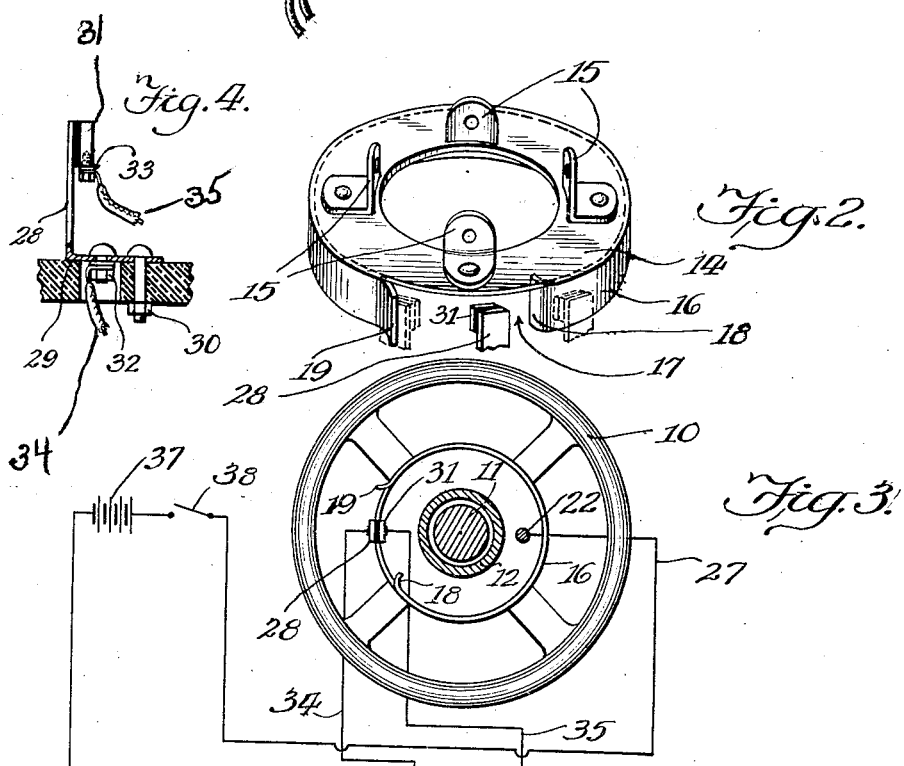
Fig.4.
Fig.2.
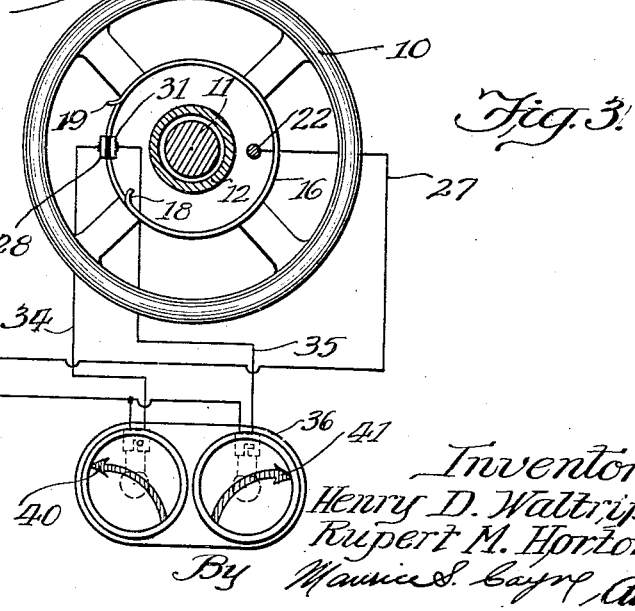
Fig.3.
Inventors:
Henry D. Waltrip.
Rupert M. Horton.
By Maurice S. Cayne Atty.

Patented Mar. 18, 1930

1,750,738

UNITED STATES PATENT OFFICE

HENRY D. WALTRIP AND RUPERT M. HORTON, OF CHICAGO, ILLINOIS

CIRCUIT CLOSER

Application filed January 18, 1929. Serial No. 333,325.

This invention relates to improvements in switching devices that can be adapted to various uses and applied to many different situations, but has particular reference to the operation of signal lights on an automobile, or the like. These lights are placed at the rear of the automobile and when lit indicate that the driver is initiating a change in direction of the travel of the vehicle.

An object of the invention is to provide an improved device of the character described which is controlled by movements of the steering post of a vehicle to operate a signal, or signals, to indicate the direction in which the vehicle is turning.

Another object of the invention is to provide an improved device of the character described in which a double contact switch is used in cooperation with a single track upon which either one of the contacts of the switch is adapted to ride when the steering post is turned, the same contact remaining in engagement with the track even though the steering wheel is turned a complete revolution or more.

A further object of the invention is to provide a device of the character described in which a double contact switch is used in cooperation with a single track for closing a circuit to one of two signals upon the turning of the steering post, said single track being electrically connected with the ignition switch of the automobile, whereby upon the turning off of the said ignition switch, the steering post may be moved to any desired position, when the automobile is parked, without actuating the signals at the rear of the car.

A still further object of the invention is to provide an improved device of the above mentioned character, which will be adapted for easy installation on an automobile, or the like, which will be durable, neat in appearance, and highly efficient in carrying out the purposes for which it is designed.

With the foregoing and other objects in view, which will appear as the description proceeds, the invention consists in certain novel and improved features of construction, arrangements, and combination of parts, hereinafter more fully described, illustrated in the accompanying drawings, and particularly pointed out in the appended claims, it being understood that various changes in the form, and minor details of the structure may be made without departing from the spirit or sacrificing any of the advantages of the invention.

Stated generally, the invention comprises an annular track of metal, or the like, having a depending integral flange, the ends of which are spaced from each other to provide a space of substantial width, said track is mounted on the steering post of a vehicle, and is adapted to turn therewith. The said track is adapted, when in assembled position, to extend into a suitable casing of suitable insulating material, said casing being mounted on the stationary sleeve surrounding the steering post, and is adapted to remain fixed thereon. Mounted in said casing, is a contact disposed in spring pressed engagement at all times with the underside of the track, said contact being electrically connected with the ignition switch of the vehicle, whereby said track will be electrically charged at all times that the ignition switch is on. A second switch having a double contact is mounted on the casing, said switch being disposed so that when the vehicle is traveling straight ahead, or nearly so, it will remain out of engagement with the depending flange, but when the vehicle is turned, one of the two contacts will engage said depending flange and close a circuit to a signal.

The depending flange has one of its free ends turned inwardly, and the other one of its free ends turned outwardly, so that when the steering post is turned, said flange will be engaged by the inner contact of the double contact switch when the vehicle is turned in one direction, and will be engaged by the outer contact of the said switch when the vehicle is turned in the other direction, the same contact remaining in engagement with the flange, even though the steering post is turned a complete revolution or more. The above described switching mechanism is suitably connected to close a circuit to one of two indicating lamps, which lamps may be mounted in a suitable casing at the rear of the vehicle, the casing being closed at the front end thereof, by suitable glass plates, or the like, each of said glass plates having an arrow painted black, provided thereon and pointing in the desired direction.

For the purpose of facilitating an understanding of our invention, we have illustrated in the accompanying drawings, a perfected embodiment thereof, from an inspection of which, when considered in connection with the following description, our invention, its mode of construction, assembly, operation, and many of its advantages should be readily understood and appreciated.

Referring to the drawings, in which similar characters of reference are employed to indicate corresponding or similar parts throughout the several figures in the drawings:—

Fig. 1 is a cross sectional view of an embodiment of the invention, mounted on a fragmentary showing of the steering post;

Fig. 2 is a view in perspective of the track member and its integral depending flange;

Fig. 3 is a top plan view of the switching device illustrating diagrammatically the operating circuits and signals controlled thereby; and Fig. 4 is a view in side elevation of the double contact switch element.

Referring to the drawings more specifically, the reference character 10, designates a steering wheel, secured to a steering post 11, and adapted for rotation therewith, said post being enclosed within a fixed sleeve 12, which is rigidly secured to the body of the vehicle in the usual and well known manner. Mounted on the post 11, and secured thereto by means of screws 13, or the like, is an annular plate or track member 14, having at the upper face thereof a plurality of upstanding lugs 15, by means of which the said track may be secured to the said post 11. The said track may be formed of metal, or other suitable conducting material, and is properly insulated, in any well known manner from said steering post. An integral depending flange 16, is formed on said track, a portion of said flange being cut away, as shown at 17, in Fig. 2, whereby the free ends of said flange may be spaced from each other as shown in the drawings.

A portion of the flange 16, adjacent one of its free ends is cut near the upper edge thereof to permit the said free end to be bent inwardly, as shown at 18, and similarly, a portion adjacent the other free end of the flange may be cut to permit the other free end to be bent outwardly, as shown at 19. The said free ends may be bent any desired amount, thus varying the width of the space 17, formed between the two free ends. As already stated, the track 14, and flange 16, may be made integral and formed of suitable metallic material adapted for conducting electricity, and for that reason the same should be properly insulated from the steering post 11.

Secured to the sleeve 12, at the upper portion thereof, is a casing 20, open at the top, and being formed of suitable insulating material and is of such a size as to readily receive therein, when in operative position on the sleeve 12, and encase the track 14, and its depending flange 16, as clearly shown in Fig. 1, of the drawings. The casing 20, may be secured in place on the sleeve 12, in any well known and suitable manner, such as by means of the lugs 21, provided thereon, at the lower portion thereof. Mounted within the casing 20, is a button or contact 22, said button passing through a suitable opening provided in the bottom wall of the casing, and also through an opening provided therefor in a suitable bracket 23, said bracket being rigidly fixed on the inside of the casing. Provided on the upper portion of the button 22, is an annular flange 24, and a coiled spring 25, surrounding the said button, said spring being disposed to act against the underside of the flange 24, and the upper face of the bracket 23, for normally maintaining the upper free end of the button in constant contacting engagement with the underside of the track 14, for energizing the same.

The lower portion of the button 22, is adapted to extend through the lower portion of the casing 20, and has provided thereon a suitable terminal 26, by means of which the conductor or wire 27, leading from the ignition switch 38, is fastened to the button. The said wire 27, may in practice, extend through the sleeve 12, and pass through an opening provided therefor in the upper portion of said sleeve 12. It is to be understood that the casing 20, is formed of suitable insulating material, whereas the button 22, is formed of suitable metallic material adapted for conducting electricity.

Secured to the bottom wall of the casing 20, at some suitable point thereon, is a double contact 28, which switch may be formed of suitable resilient metallic conducting material, and is provided with a substantially horizontally disposed foot portion 29, by means of which it may be rigidly secured to the bottom wall of the casing 20, through the use of a screw 30, or the like. The contact 28, is substantially L shaped in form, and is so disposed when in operative position in the casing 20, as to have the vertical portion thereof engage with the flange 16, when the latter is rotated upon the rotation of the steering post for turning the vehicle. To the upper portion of the switch 28, is secured on the inner side thereof a second contact element 31, which element is properly insulated from the main body of the switch 28, and is rigidly secured thereto in any well kown manner. Both the main contact 28, and the contact element 31, are provided with suitable terminal posts 32, and 33, respectively, to which posts are secured the ends of the wires 34, and 35 respectively, both of said wires passing out of the casing 20, and into the sleeve 12, through an opening in the upper portion thereof, and from there to the lamp casing 36, mounted at the rear of the vehicle. As stated, the body of the switch 28 is constructed of a light resilient material, and has sufficient flexibility to permit the same to engage either the inner surface or the outer surface of the track 16.

The elements above described are so disposed that upon the rotation of the steering post 11, the depending flange 16, which rotates therewith, will be brought into contacting engagement with either the main contact 28, or the contact element 31, depending upon the direction of rotation of the steering wheel. When the post 11, is in its normal position, that is, when the vehicle is moving straight ahead, or nearly so, the space 17, between the free ends of the depending flange 16, will be disposed opposite the contact 28, and this space is of sufficient width to permit of the usual play in the steering post, without causing either end of the flange 16, to engage with either contact of the contact 28. However, when the steering post 11, is turned sufficiently to change the direction of travel of the vehicle, the depending flange 16, will be moved therewith to engage either the switch 28, or the contact element 31, and thus close a circuit for operating a signal which will indicate the direction in which the vehicle is turning. From an inspection of Figs. 2, and 3, of the drawings, it will be noted that when the steering wheel is turned to the right, the contact element 31, will engage the depending flange 16, said contact 31, remaining in engagement with the flange no matter how much the wheel is turned, even though it be a complete revolution or more. On the other hand, when the steering wheel is turned to the left, the switch 28, will be engaged by the flange 16, said switch remaining in contact with the flange as long as the wheel is being turned to the left, even though this be a complete revolution or more.

The signals employed in connection with the switching device are preferably visible signals, and as shown in Fig. 3, a set of signals designated by the reference character 36, is provided, said set being mounted at the rear of the vehicle. The lamps are arranged in said casing 36, so that when the operating circuit for either one is closed, the lamp will light to indicate the direction in which the vehicle is turning.

The operation of the device is as follows: When the vehicle is traveling straight ahead, or nearly so, the space 17, will be disposed opposite the contact 28, and the lights in the casing 36, will not be lit. If the steering post 11, should be turned to the left, as viewed in Fig. 3, the depending flange 16, will be moved with the turning of the steering post, and if moved far enough will engage the outer side of the contact 28, the inner side of said flange riding against the outer side of said contact, thus a circuit is closed extending from the battery 37, through the ignition switch 38, which of course is the ignition switch of the engine, fixed contact button 22, the depending flange 16, the contact switch 28, conductor 34, the left hand lamp of the set 36, and from there to the other terminal of the battery 37. In a similar manner when the wheel is turned to the right, as viewed in Fig. 3, a circuit is closed extending from the battery 37, through the ignition switch 38, fixed contact button 22, the depending flange 16, the contact element 31, conductor 35, the right hand lamp of the set 36, and from there to the other terminal of the battery 37.

In operation the signal lamps may be enclosed in a casing having the front wall thereof closed by a glass plate, the inside of which may be suitably frosted, and having arrows 40, and 41, or the like indicating means, painted black, and pointing in the proper direction for visibly indicating the direction of travel of the vehicle. By frosting the glass plate on the inner side and painting the arrows thereon, these arrows will not be visible either at night or during the day except when the lamps in the casing 36 are lit. Thus the signal will be as effective during day driving as well as during night driving.

From the foregoing description, it will be obvious that the invention provides a direction indicating mechanism for vehicles, the switching device of which may be readily applied in position on the steering post of the vehicle and which will effectively operate to control the direction indicating signals in accordance with the movements of said steering post. It will be noted, that the device is so constructed and assembled as to make the same operative only when the ignition switch of the engine is on, thus when the vehicle is parked along a curb or the like, the front wheels of the said vehicle may be turned any amount without closing the circuit to either of the signal lamps. It will also be noted that the device is so constructed that the turning of the steering wheel in one direction will close a circuit to one of the signal lamps, said circuit remaining closed regardless how far the steering wheel may be turned.

It is believed that our invention, its mode of construction, and many of its advantages should be readily understood from the foregoing without further description, and should be also manifest that while a preferred embodiment of the invention has been shown and described for illustrative purposes, the structural details are nevertheless capable of wide variation within the purview of our invention, as defined in the appended claims.

What we claim and desire to secure by Letters Patent of the United States is:—

1. In a direction indicating mechanism of the character described, the combination with a steering post and a sleeve of a steering mechanism, of an annular track mounted and insulated from said post and adapted for rotation therewith, a depending flange extending from said track and having the ends thereof spaced from each other, a spring pressed button mounted on said sleeve and insulated therefrom, said button being adapted for constant engagement with said track, and a double contact switch also mounted on said sleeve and insulated therefrom, one contact of said double contact switch being adapted for engagement with the depending flange when the steering post is rotated in one direction, and the other contact of said double contact switch being adapted for engagement with the depending flange when the steering post is moved in the other direction.

2. In a direction indicating mechanism of the character described, the combination with a steering post and a sleeve of a steering mechanism, of a double contact switch mounted on and insulated from said sleeve, and an annular track carried by said post and insulated therefrom, said track having a depending flange, a portion of which is cut away to provide a pair of spaced ends, one of which is bent inwardly and the other is bent outwardly.

3. In a direction indicating mechanism of the character described, the combination with a steering post and a sleeve of a steering mechanism, of a double contact switch mounted on and insulated from said sleeve, an annular track mounted on and insulated from the post and adapted to rotate therewith, a depending flange formed integral with said track and adapted for engagement with said double contact switch, said flange having a portion thereof cut away to provide a pair of spaced ends, one of said ends being bent inwardly and the other of said ends being bent outwardly, whereby upon the rotation of said steering post, said flange will engage with one contact of the double contact switch when moved in one direction, and will engage with the other contact of said double contact switch when moved in the other direction.

4. In a direction indicating mechanism of the character described, the combination with a steering post and a sleeve of a steering mechanism, of an annular member having a depending flange mounted on said post and insulated therefrom, a portion of said flange being cut away, one of the ends adjacent said cut away portion being bent inwardly and the other of the ends adjacent said cut away portion being bent outwardly, a double contact switch mounted on said sleeve and insulated therefrom, said switch being disposed for engagement by said flange when the steering post is rotated for changing the direction of travel of the vehicle, but is adapted to be positioned between the said bent ends of said flange when the vehicle is traveling straight ahead, said flange being adapted to engage one contact of said double contact switch when moved in one direction and to engage the other contact of said double contact switch when moved in the other direction.

In testimony whereof we affix our signatures.

HENRY D. WALTRIP.
RUPERT M. HORTON.